United States Patent [19]

Shimada et al.

[11] Patent Number: 4,982,210

[45] Date of Patent: Jan. 1, 1991

[54] FLASH DEVICE

[75] Inventors: Takahisa Shimada; Togo Teramoto; Toshihiko Taniguchi; Nobuharu Murashima; Makoto Yanai, all of Osaka, Japan

[73] Assignee: Minolta Camera Kabushiki Kaisha, Osaka, Japan

[21] Appl. No.: 349,843

[22] Filed: May 10, 1989

[30] Foreign Application Priority Data

| May 11, 1988 | [JP] | Japan | 63-112592 |
| May 11, 1988 | [JP] | Japan | 63-112593 |
| May 11, 1988 | [JP] | Japan | 63-112594 |
| May 11, 1988 | [JP] | Japan | 63-61119 |

[51] Int. Cl.$^5$ ............................................. G03B 15/03
[52] U.S. Cl. .................................................... 354/149.1
[58] Field of Search ............ 354/145.1, 149.1, 149.11; 362/18

[56] References Cited

U.S. PATENT DOCUMENTS

| 3,603,781 | 9/1971 | Kobayashi et al. | 362/18 X |
| 4,423,940 | 9/1984 | Kashihara et al. | 354/149.1 |
| 4,682,273 | 7/1987 | Taniguchi et al. | 362/18 |
| 4,771,303 | 9/1988 | Matsumoto et al. | 354/195.12 |

FOREIGN PATENT DOCUMENTS 275089  7/1988  European Pat. Off. ....... 354/149.11

Primary Examiner—Brian W. Brown
Attorney, Agent, or Firm—Burns, Doane, Swecker & Mathis

[57] ABSTRACT

A flash device in which a mechanism for shifting a light emitting section up and down and a mechanism for changing over the light distribution angle can be automatically controlled by means of a single motor and which occupies a comparatively small spacing when mounted on a camera. The flash device includes a bidirectional drive motor mounted in a body member, and a shiftable member having the light emitting section thereon. The shiftable member is shifted by rotation of the motor in either direction between a retracted inoperative position and a projected operative position. The light distribution angle of the light emitting section is changed over by continued energization of the motor after the shiftable member is moved from the inoperative to the operative position. A friction mechanism is interposed in a motion transmitting mechanism from the motor to the shiftable member. The motor and the motion transmitting mechanism are disposed at a location within the body member at which they are located, when mounted on a camera, above a spacing sidewardly of a central portion of the camera in which a pentagonal prism is disposed.

10 Claims, 13 Drawing Sheets

FLASH DEVICE

BACKGROUND OF THE INVENTION

1. Field of the Invention

This invention relates to a flash device suitable for use with a camera.

2. Description of the Prior Art

A flash device for a camera normally includes a light emitter unit, a capacitor, a flash circuit and a casing as principal components. A built-in auxiliary light unit is provided in some flash devices for automatic focusing cameras. A light emitter unit is composed of a reflector, a xenon tube and so on and is normally disposed so as to assure a maximum distance between a light emitting section of the light emitter unit and an optical axis of a photographing lens of a camera in order to minimize or eliminate a read-eye phenomenon.

To this end, some known cameras have a shiftable casing section mounted for shifting movement on a body casing section to and from an operative position in which a light emitter section mounted in the shiftable casing section is projected outside the body casing section. In most of such known cameras, shifting movement of the shiftable casing section must be performed by manual operation of a user.

Meanwhile, some known flash devices are designed so as to change over the light distribution angle thereof in accordance with a focal length of a photographing lens of a camera in order to make use of light energy more effectively. Such flash devices are on the market as flash devices of a comparatively large size, and most of them are of the manually operated type.

In recent years, built-in type flash devices have been developed which include means for controlling a light emitting section by means of a motor. In such flash devices, rotation of the motor is transmitted by way of a gear train to shift the light emitting section up or down by means of a cam element provided at the final stage of the gear train.

However, a structure suitable for use with a flash device of a small size for changing over the light distribution angle in accordance with a focal length of a photographing lens of a camera has not yet been provided. A flash device which includes both a shifting mechanism for a light emitter unit and a mechanism for automatically changing over the light distribution angle has not yet been developed either.

Meanwhile, a flash device for a camera is already known wherein a light emitting section provided in a camera body is shifted up or down by a motor means.

Such mechanism for controlling shifting movement of a light emitting section by means of a motor has not been developed for nor employed in a clip-on type flash device unit which can be removably mounted at a shoe seat thereof on an accessory shoe of a body of a camera such as a single lens reflex camera.

SUMMARY OF THE INVENTION

It is an object of the present invention to provide a flash device wherein a mechanism for shifting a light emitting section up and down and a mechanism for changing over the light distribution angle can be automatically controlled by means of a single motor.

It is another object of the present invention to provide a flash device adapted to be removably mounted at a shoe seat thereof on a body of a camera wherein a light emitting section can be shifted, when the flash device is to be used, by a motor to a position spaced from an optical axis of an optical system of the camera to eliminate occurrence of a red-eye phenomenon.

It is another object of the present invention to provide a flash device adapted to be removably mounted at a shoe seat thereof on a body of a camera which includes a light emitting section and a driving mechanism including a motor for shifting the light emitting section but occupies, when mounted on a camera, a similar spacing as a flash device which does not include such driving mechanism.

It is a further object of the present invention to provide a flash device wherein an auxiliary illuminating light projecting device for assisting detection of a distance to an object can be disposed efficiently with respect to a light emitting section.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
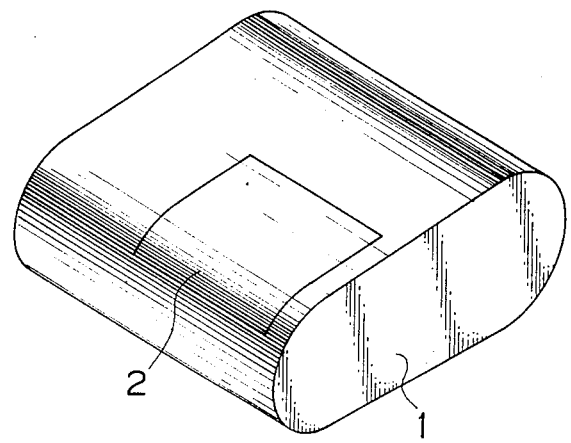
FIG. 1 is a perspective view of a flash device showing a first embodiment of the present invention.
Figure 2:
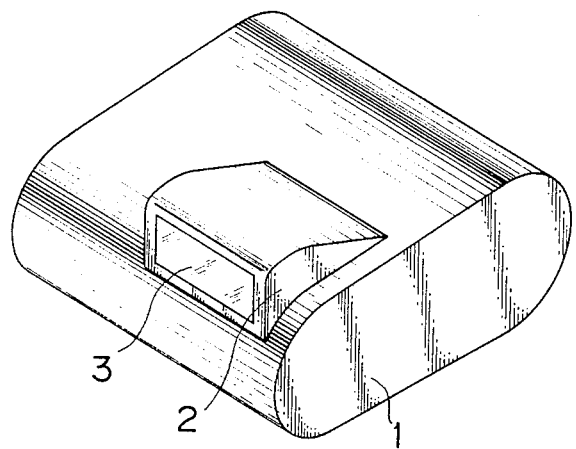
FIG. 2 is a perspective view of the flash device of FIG. 1 with a light emitting section carrying member positioned at an operative position.

Referring first to FIGS. 1 and 2, there is shown an entire flash device to which the present invention is applied. The flash device shown includes a flash device body 1 and a shiftable casing section or light emitting section carrying member 2 having a light radiating panel 3 mounted on a front wall thereof. Though not shown, the light emitting section carrying member 2 has a reflector, a xenon tube and so on supported in the inside thereof.

In FIG. 1, the light emitting section carrying member 2 is shown at an inoperative position in which it is accommodated in the flash device body 1 and the light radiating panel 3 thereof cannot be observed from the outside. To the contrary, in FIG. 2, the light emitting section carrying member 2 is shown at an operative position in which it is projected upwardly outwardly from the flash device body 1 and the light radiating panel 3 thereof is exposed to the outside so that it can radiate light therefrom.

Referring now to FIGS. 3 to 6, there is shown a mechanism for shifting the light emitting section carrying member 2 up and down between the inoperative position and the operative position. The mechanism includes a motor 4 mounted on a first base plate 15 secured to the flash device body 1. A pinion 5 is mounted on an output power shaft 4a of the motor 4 and held in meshing engagement with a larger diameter gear 6a of a gear member 6 mounted for rotation around a shaft 15a which is formed in an integral relationship on the first base plate 15. The gear member 6 has another smaller diameter gear 6b which is held in meshing engagement with a larger diameter gear 7a of another gear member 7 mounted for rotation around another shaft 15b which is also formed in an integral relationship on the first base plate 15. The gear member 7 has another smaller diameter gear 7b which is held in meshing engagement with a further gear member 8 mounted for rotation around a further shaft 15c which is formed in an integral relationship on the first base plate 15. A still further gear member 9 is mounted for rotation around the shaft 15c on which the gear member 8 is mounted. A compression coil spring 10 is fitted around the shaft 15c and interposed between the gear members 8 and 9 to urge the gear members 8 and 9 away from each other. The compression coil spring 10 thus forms a frictional coupling mechanism which normally establishes integral rotation between the gear members 8 and 9 but yields a slip between the gear members 8 and 9 when a torque higher than a predetermined level is applied between them. The urging force of the compression coil spring 10 is selected such that such torque may have a sufficiently higher value than a torque required to shift the light emitting section carrying member 2 between the inoperative position and the operative position. The gear 9 is normally held in meshing engagement with a toothed portion 11a of a driving member 11 mounted for rotation around a shaft 15d which is formed in an integral relationship on the first base plate 15.

The driving member 11 has a lateral projection 11b formed at an end thereof and fitted in a cam hole 2b formed in a side wall of the light emitting section carrying member 2. The cam hole 2b is formed at a location of the light emitting section carrying member 2 at which it cannot be observed from the outside when the light emitting section carrying member is at the upwardly projected operative position as shown in FIG. 2. Since the projection 11b of the driving member 11 is fitted in the cam hole 2b of the light emitting section carrying member 2 which is supported for rotation around the shaft portion 2a relative to the flash device body 1, rotation of the driving member 11 will change over the light emitting section carrying member 2 between the retracted inoperative position and the projected operative position with respect to the flash device body 1.

The driving member 11 has a pair of boss portions 11c formed thereon, and a switch contact element 12 is secured to the driving member 11 by caulking at the boss portions 11c of the latter. A switch base plate 13 is mounted on a second base plate 16 in an opposing relationship to the switch contact element 12. The switch base plate 13 is secured to the second base plate 16 by caulking at a pair of hollow pins 14 on the second base plate 16 which are fitted in a pair of holes 13a formed in the switch base plate 13.

Figure 6:
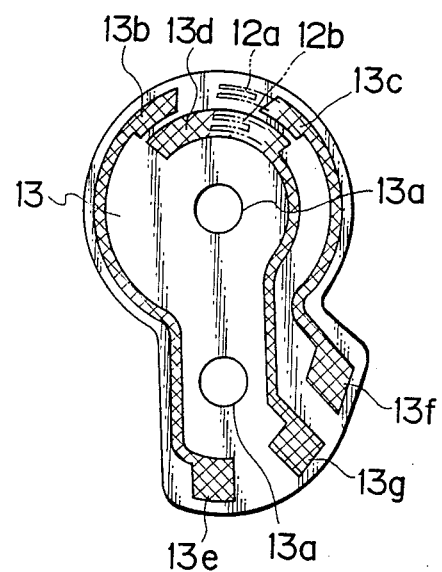
FIG. 6 is an enlarged side elevational view of a switch section of the driving mechanism of FIG. 4.
Figure 7:
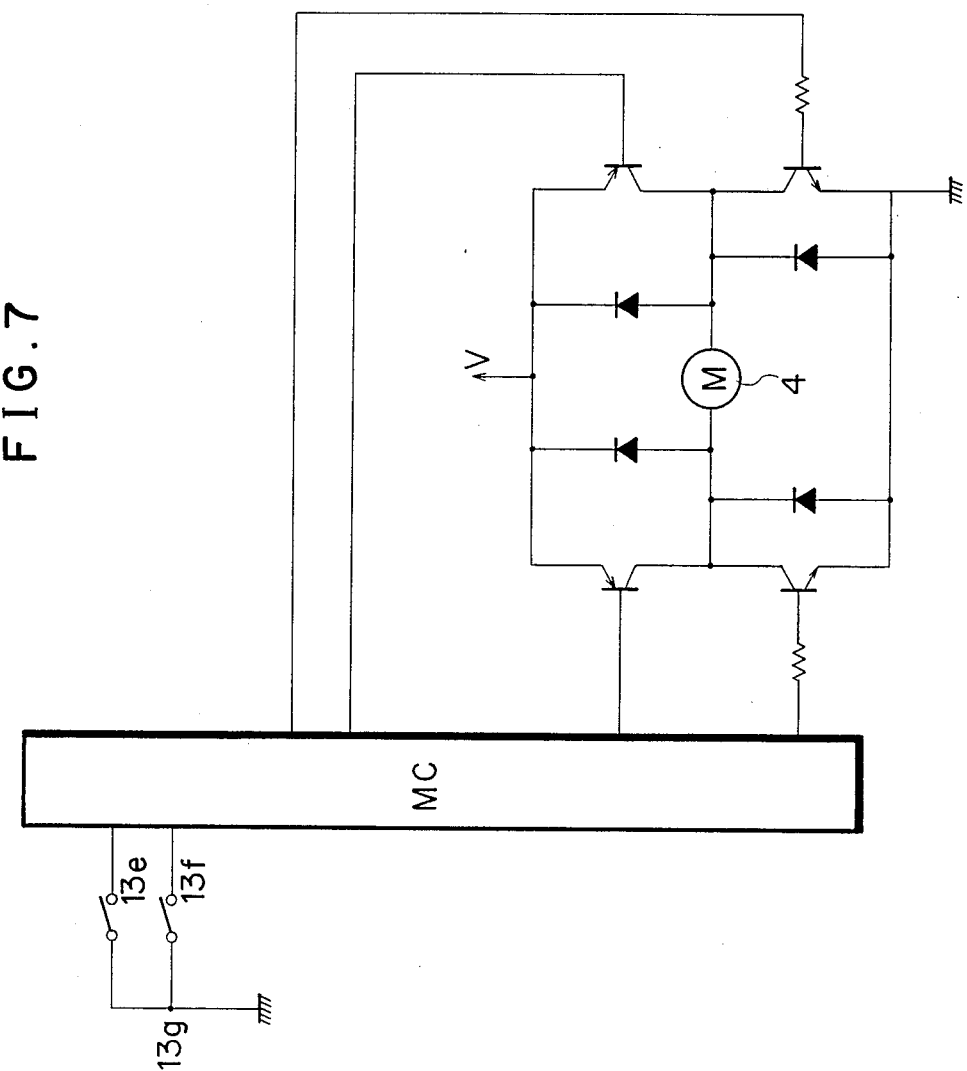
FIG. 7 is a circuit diagram of a control circuit for the driving mechanism of FIG. 3.

Referring particularly to FIG. 6, the switch base plate 13 has up to three switch patterns including a first pattern consisting of a pair of pattern portions 13b and 13e, a second pattern consisting of a pair of pattern portions 13c and 13f, and a third pattern consisting of a pair of pattern portions 13d and 13g. The switch contact element 12 is positioned relative to the switch base plate 13 such that a first end portion 12a thereof slidably moves on the pattern portion 13b or 13c of the first or second pattern while a second end portion 12b thereof slidably moves on the pattern portion 13d of the third pattern. The pattern portions 13b, 13c and 13d are wired to the other side of the switch base plate 13 and connected to the pattern portions 13e, 13f and 13g, respectively. Lead wires, a flexible circuit board or the like are soldered to the pattern portions 13e, 13f and 13g and electrically connected to a control circuit which is diagrammatically shown in FIG. 7. Though not specifically shown, the pattern 13g is grounded.

The first end portion 12a of the switch contact element 12 is positioned such that it is contacted with the pattern portion 13b of the first pattern when the light emitting section carrying member 2 is shifted up to the lifted or projected operative position, but when the light emitting section carrying member 2 is shifted down to the lowered or retracted inoperative position, it is contacted with the pattern portion 13c of the second pattern. To the contrary, the second end portion 12b of the switch contact element 12 is normally held in contact with the pattern portion 13d of the third pattern. Consequently, when the light emitting section carrying member 2 is shifted to the operative position, the pattern portion 13e is grounded, but when the light emitting section carrying member 2 is shifted to the inoperative position, the pattern 13f is grounded. Accordingly, detection of potentials at the pattern portions 13e and 13f will reveal at which one of the operative and inoperative positions and an intermediate position between the two positions the light emitting section carrying member 2 is positioned currently. When the light emitting section carrying member 2 is shifted to the operative position or the inoperative position, the first end portion 12a of the switch contact element 12 is brought into contact with the pattern portion 13b or 13c a little forwardly of a position at which a laterally bent lug 2c formed on the light emitting section carrying member 2 is brought into abutment with and stopped by either one of a pair of upper and lower stops 19 and 20 by means of which the light emitting section carrying member 2 can be stopped with certainty at the operative and inoperative positions. The upper and lower stops 19 and 20 may be provided on a side wall of the flash device body 1.

End portions 15e and 15f of the shafts 15a and 15b of the first base plate 15 are received in perforations formed in the second base plate 16 and end portions 15g and 15h of the shafts 15c and 15d of the first base plate 15 are received in bores 14a of the hollow pins 14 so that the gear members 6, 7, 8 and 9 and the driving member 11 are held from movement in thrust directions by the second base plate 16.

Figure 5:
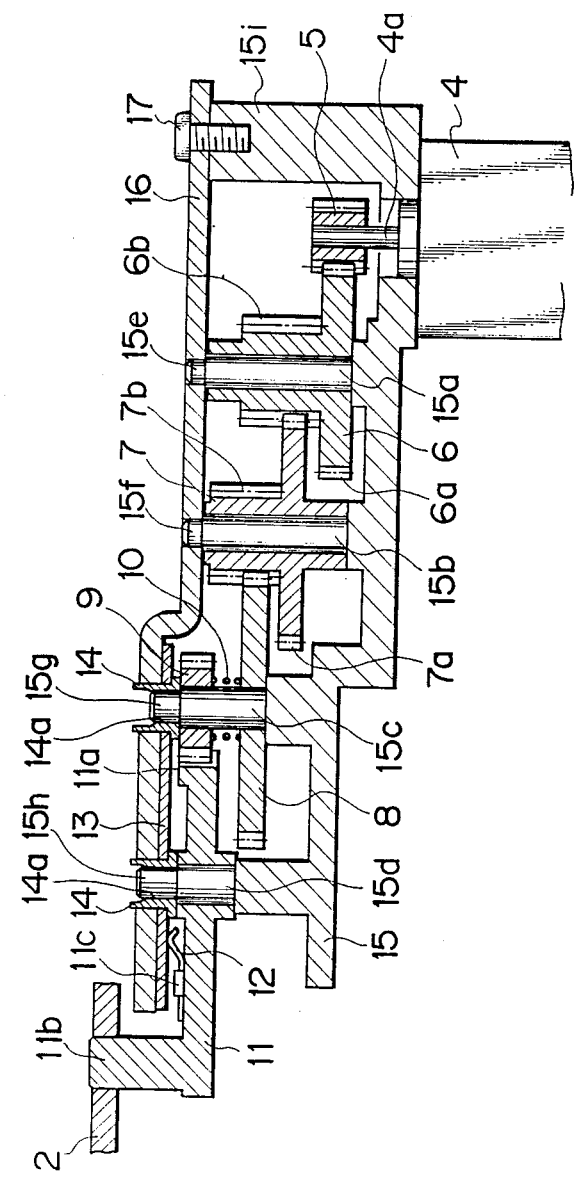
FIG. 5 is a sectional view of the driving mechanism of FIG. 3 taken along a line interconnecting axes of gear elements of the driving mechanism.

The first and second base plates 15 and 16 are securely coupled to each other at an end portion 15i of the first base plate 15 by means of a plurality of fastening screws 17 while only one of such screws 17 is shown in FIG. 5. The entire driving mechanism is thus formed into a unit by the first and second base plates 15 and 16, and the driving unit is secured to the flash device body 1 by suitable means not shown.

Figure 3:
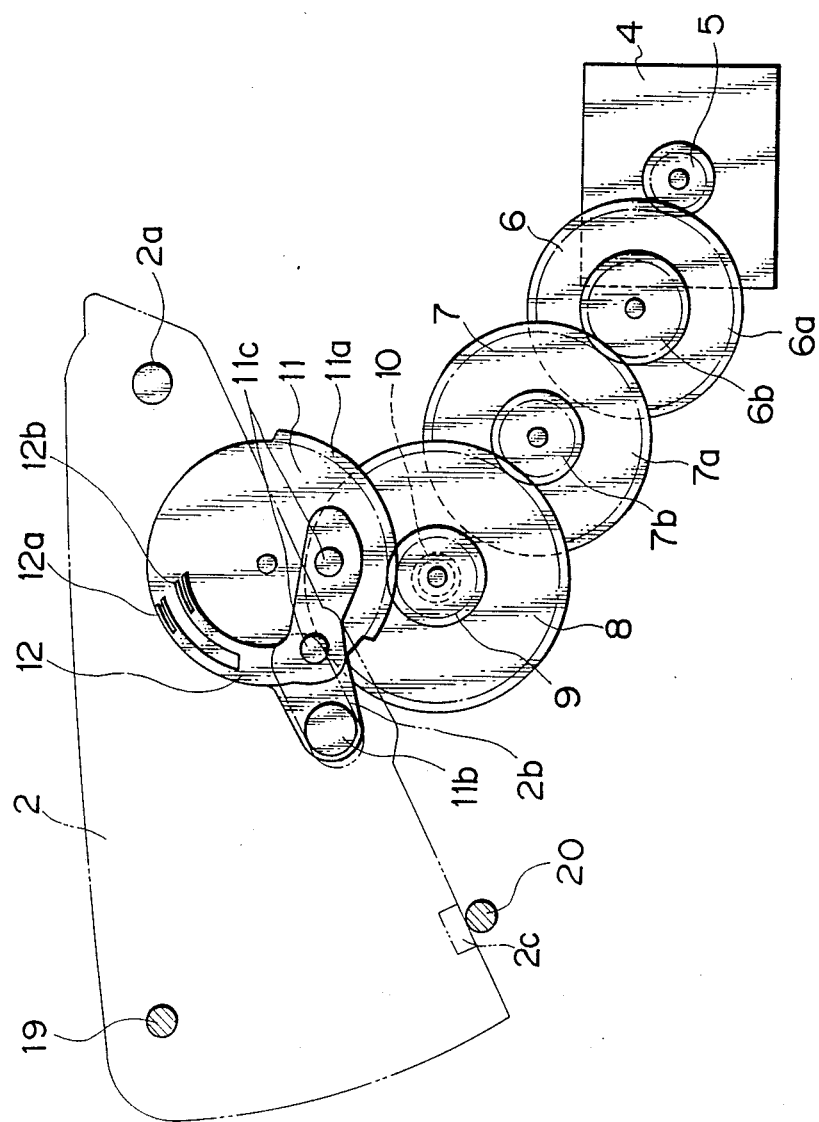
FIG. 3 is a schematic side elevational view of a driving mechanism of the flash device of FIG. 1 when the light emitting section carrying member is positioned at an inoperative position.
Figure 4:
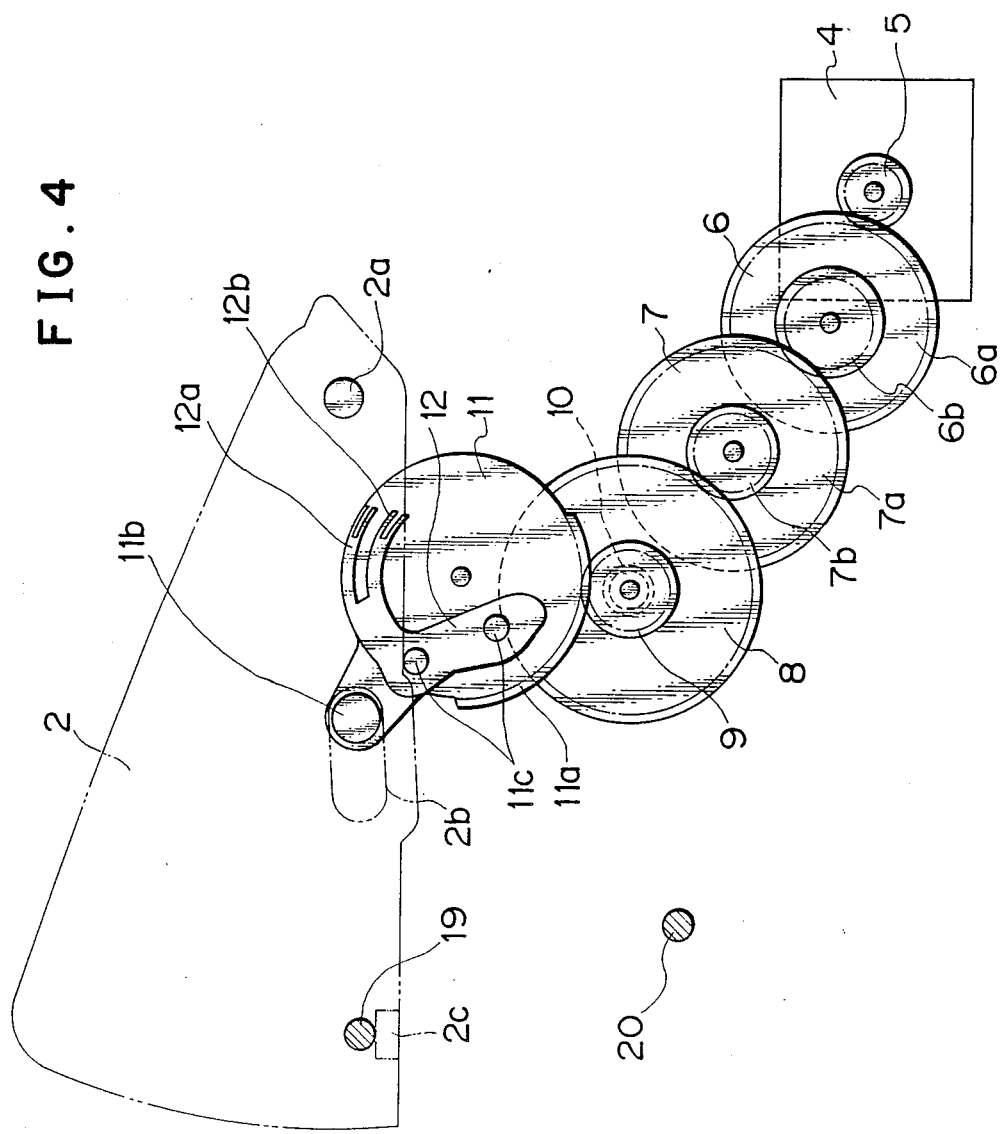
FIG. 4 is a similar view but showing the driving mechanism of FIG. 3 when the light emitting section carrying member is positioned at the operative position.

In order to shift the light emitting section carrying member 2 from the inoperative position shown in FIG. 3 to the operative position shown in FIG. 4, the motor 4 is energized to rotate the motor shaft 4a, that is, the pinion 5 in the clockwise direction in FIG. 3 or 4. Consequently, the gear member 8 is rotated in the counterclockwise direction by the pinion 5 by way of the gear members 6 and 7, and such rotation of the gear member 8 drives the gear member 9 to rotate in the counterclockwise direction in FIGS. 3 or 4 by way of the friction mechanism or compression coil spring 10 so that the driving member 11 is pivoted in the clockwise direction by way of the toothed portion 11a thereof held in meshing engagement with the gear member 9. Thereupon, the projection 11b formed on the driving member 11 and fitted in the cam hole 2b of the light emitting section carrying member 2 pivots the light emitting section carrying member 2 around the shaft portion 2a to lift the light emitting section carrying member 2 from the flash device body 1. Then, just before the laterally bent lug 2c of the light emitting section carrying member 2 is contacted with and stopped by the upper stop 19 for defining the operative position of the light emitting section carrying member 2, the first end portion 12a of the switch contact element 12 is brought into contact with the pattern portion 13b of the switch base plate 13. Thereupon, a microcomputer MC of the control circuit shown in FIG. 7 detects in accordance with such signal from the pattern portion 13e connected to the pattern portion 13b that the light emitting section carrying member 2 has been shifted to the operative position. After the point of time of such detection, the microcomputer MC keeps the motor 4 energized for a predetermined period of time so that, when the motor 4 is subsequently deenergized, the light emitting section carrying member 2 may be positioned with certainty at the operative position in which it is stopped by the upper stop 19.

When the laterally bent lug 2c of the light emitting section carrying member 2 is contacted with and stopped by the upper stop 19, great force acts due to the inertia of the motor 4 and the gear train. However, since the friction mechanism or compression coil spring 10 is interposed between the gear members 8 and 9, a slip is yielded between the gear members 8 and 9 to absorb the inertial force. Consequently, the motion transmitting mechanism including the gear train will not be damaged by such inertial force. Besides, even if the light emitting section carrying member 2 is held down at the inoperative position, for example, by a hand of an operator during such operation for lifting movement of the light emitting section carrying member 2, driving force of the motor 4 is absorbed at the friction mechanism between the gear members 8 and 9 and will not damage the motion transmitting mechanism including the gear train.

In order to shift the light emitting section carrying member 2 from the operative position shown in FIG. 4 to the inoperative position shown in FIG. 3, the motor 4 is energized reversely so that the pinion 5 may be rotated reversely in the counterclockwise direction in FIGS. 3 or 4. Rotation of the pinion 5 in the counterclockwise direction is transmitted by way of the gear members 6, 7 and 8, compression coil spring 10 and gear member 9 to pivot the driving member 11 in the counterclockwise direction. Thereupon, the projection 11b of the driving member 11 fitted in the cam hole 2b of the light emitting section carrying member 2 downwardly in the counterclockwise direction around the shaft portion 2a. Then, just before the light emitting section carrying member 2 reaches the inoperative position, that is, just before the laterally bent lug 2c of the light emitting section carrying member 2 is brought into contact with and stopped by the lower stop 20 defining the inoperative position of the light emitting section carrying member 2, the first end portion 12a of the switch contact element 12 is brought into contact with the pattern portion 13c of the switch base plate 13, whereupon the microcomputer MC of the control circuit shown in FIG. 7 detects in accordance with such signal from the pattern portion 13f connected to the pattern portion 13c that the light emitting section carrying member 2 has been shifted to the inoperative position. The microcomputer MC then keeps the motor 4 energized for the predetermined period of time until the light emitting section carrying member 2 is positioned with certainty at the inoperative position in which it is stopped by the lower stop 20.

Also in this instance, the inertial force of the motor 4 and the gear train is absorbed due to a slip yielded at the friction mechanism or compression coil spring 10 interposed between the gear members 8 and 9. Also if the light emitting section carrying member 2 is stopped from downward shifting movement from the operative position, the motion transmitting mechanism including the gear train will not be damaged due to such slip between the gear members 8 and 9.

In case the motor 4 cannot be started due to a sag of the voltage of a power source and the light emitting section carrying member 2 is stopped at the operative position or at an intermediate position between the operative and inoperative position, an operator can move the light emitting section carrying member 2 back to the inoperative position by pushing the same by hand. Also in this instance, the light emitting section carrying member 2 can be moved to the inoperative position readily by pushing force of some magnitude due to a slip yielded at the friction mechanism or compression coil spring 10 interposed between the gear members 8 and 9.

Accordingly, the motion transmitting mechanism including the gear train will not be damaged.

In the embodiment described above, the light emitting section carrying member 2 is shifted up and down with respect to the flash device body 1. However, the present invention can be applied also to a flash device which is installed in a camera body and includes a shiftable light emitting section carrying member.

Meanwhile, the light emitting section carrying member 2 need not be mounted for pivotal motion around an axis and may be mounted for up and down shifting motion, for example, by means of a link mechanism.

Figure 8:
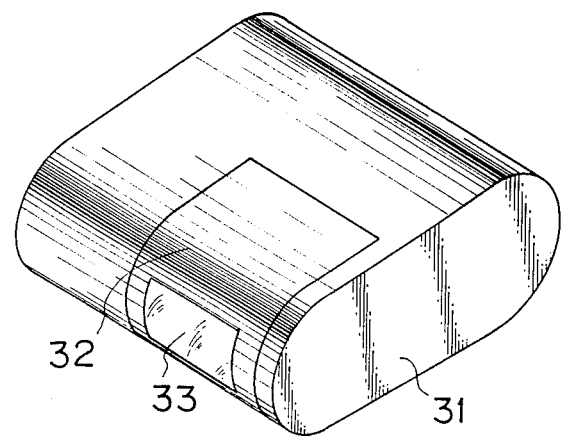
FIG. 8 is a perspective view of a flash device showing a second embodiment of the present invention.
Figure 9:
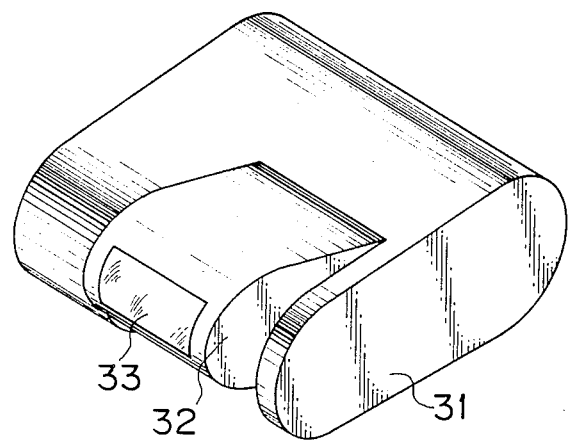
FIG. 9 is a perspective view of the flash device of FIG. 8 with a light emitting section carrying member positioned at an operative position.

Referring now to FIGS. 8 and 9, there is shown another entire flash device to which the present invention is applied. The flash device shown includes a flash device body 31 and a shiftable case section or light emitting section carrying member 32 having a light radiating panel 33 mounted on a front wall thereof. Though not shown in FIGS. 8 nor 9, the shiftable case section 32 has a reflector, a xenon tube and so on supported in the inside thereof.

In FIG. 8, the light emitting section carrying member 2 is shown at an inoperative position in which it lies on the same plane as the flash device body 31. To the contrary, in FIG. 9, the shiftable case section 32 is shown at an operative position in which it is projected upwardly outwards from the flash device body 31. Distinct from the flash device of the first embodiment shown in FIGS. 1 to 7, in the case of the flash device of the present embodiment, the light radiating panel 33 is always exposed to and observed from the outside so that it can radiate light therefrom.

Figure 10:
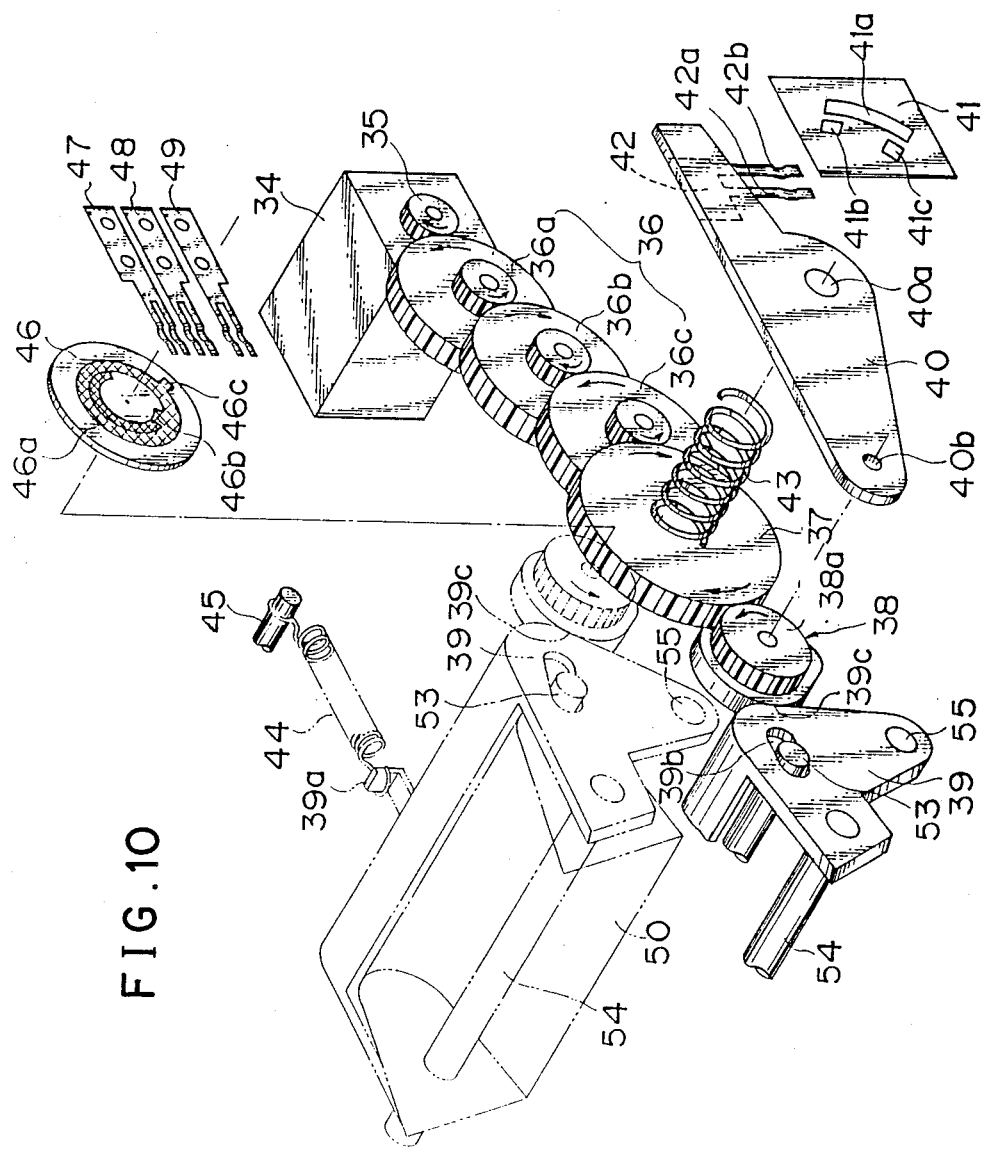
FIG. 10 is a fragmentary perspective view showing an internal mechanism of the flash device of FIG. 8.

Referring not to FIG. 10, there is shown an internal mechanism for shifting the shiftable case section 32 up and down between the inoperative position and the operative position and changing over the light distribution of a light emitting section using a single motor. The mechanism includes a motor 34 secured to the flash device body 31. A pinion 35 is mounted on an output power shaft of the motor 34, and a reduction gear train 36 is interposed between the pinion 35 and a sun gear 37. The gear train 36 includes three gear members 36a, 36b and 36c each consisting of a pair of larger and smaller diameter gear wheels. The larger diameter gear wheel of the gear member 36a is held in meshing engagement with the pinion 35 on the output power shaft of the motor 34 while the sun gear 37 is held in meshing engagement with the smaller diameter gear wheel of the gear member 36c so that the gear train 36 transmits, when the motor 34 is rotated, driving force from the pinion 35 to the sun gear 37 to move the shiftable case section 32 between the operative and inoperative positions. The sun gear 37 is mounted for rotation at a mounting hole 40a of a planet gear carrier 40 by means of a shaft not shown and is further held in meshing engagement with a planet gear 38 which is also mounted for rotation at another mounting hole 40b of the planet gear carrier 40 by means of another shaft not shown. The planet gear carrier 40 is mounted for rotation on the flash device body 31 by means of the shaft for the sun gear 37.

A compression coil spring 43 serving as a friction mechanism is interposed between the sun gear 37 and the planet gear carrier 40 and fitted around the shaft for the sun gear 37 so that rotation of the sun gear 37 may be transmitted to the planet gear carrier 40 by way of the compression coil spring 13 to pivot the planet gear carrier 40 around an axis of the hole 40a of the planet gear carrier 40, that is, around the shaft for the sun gear 37. Though not specifically shown, the planet gear carrier 40 is securely mounted on the shiftable case section 32 so that pivotal motion thereof in the clockwise direction in FIG. 10 around the axis of the hole 40a will pivot the shiftable case section 32 to move toward the operative lifted position and opposite pivotal motion thereof in the counterclockwise direction will pivot the shiftable case section 32 to move toward the inoperative lowered position.

A light emitting section position detecting contact member 42 for detecting a position of the shiftable case section 32 is mounted at an end portion of the planet gear carrier 40 remote from the hole 40b while a light emitting section position detecting base plate 41 is mounted on the flash device body 31. The light emitting section position detecting contact member 42 has a pair of light emitting section detecting contacts 42a and 42b. Meanwhile, the light emitting section position detecting base plate 41 has three contact patterns formed thereon and including a grounding pattern 41a normally held in contact with the contact 42b of the light emitting section position detecting contact member 42, an inoperative position detecting pattern 41b and an operative position detecting pattern 41c located for contacting with the other contact 42a of the light emitting section position detecting contact member 42. A position of the shiftable case section 32 with respect to the flash device body 31 is thus detected from a contacting relationship between the light emitting section position detecting contact member 42 and the light emitting section position detecting base plate 41. Thus, if it is detected that the shiftable case section 32 is at the operative lifted position, then information of a focal length of a photographing lens of a camera on which the flash device is provided is read in as hereinafter described, and the mechanism is operated to control the light distribution angle of the light emitting section in response to the information thus read. To the contrary, if it is detected that the shiftable case section 32 is at the inoperative lowered position, then the motor 34 is stopped in response to such signal. It is to be noted that naturally the locations of the light emitting section detecting base plate 41 and the light emitting section detecting contact member 42 may be replaced with each other.

The planet gear 38 includes a gear portion 38a held in meshing engagement with the sun gear 37 and a cam portion 38b formed in an integral relationship with the gear portion 38a and having a cam lobe 38c. The cam portion 38b of the planet gear 38 is normally held in contact with a cam face 39c of a xenon tube supporting member 39 which constitutes part of the shiftable case section 32.

The xenon tube supporting member 39 is mounted for pivotal motion on a pair of support shafts 55 (only one is shown in FIG. 10) formed on the shiftable case section 32. A tension spring 44 extends between a fixed pin 45 provided on the shiftable case section 32 and an anchoring tab 39a formed on the xenon tube supporting member 39 to urge the xenon tube supporting member 39 in the clockwise direction in FIG. 10 around a common axis of the support shafts 55 to contact the cam portion 39c of the xenon tube supporting member 39 with the cam portion 38b of the planet gear 38. The xenon tube supporting member 39 has an elongated guide hole 39b formed therein, and a guide pin 53 formed on the shiftable case section 32 extends through the guide hole 39b so that the xenon tube supporting member 39 can be displaced within the extent of the guide hole 39b by the cam portion 38b of the planet gear 38.

Figure 11:
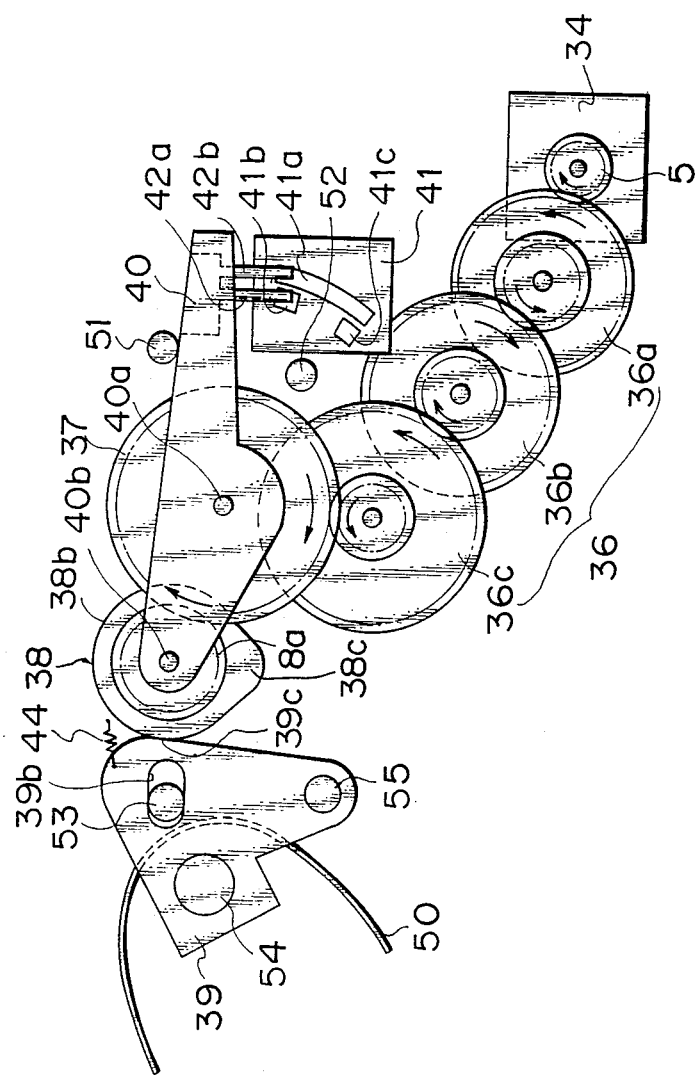
FIG. 11 is a schematic side elevational view showing the internal mechanism of FIG. 10 when a shiftable casing section is positioned at an inoperative position.
Figure 12:
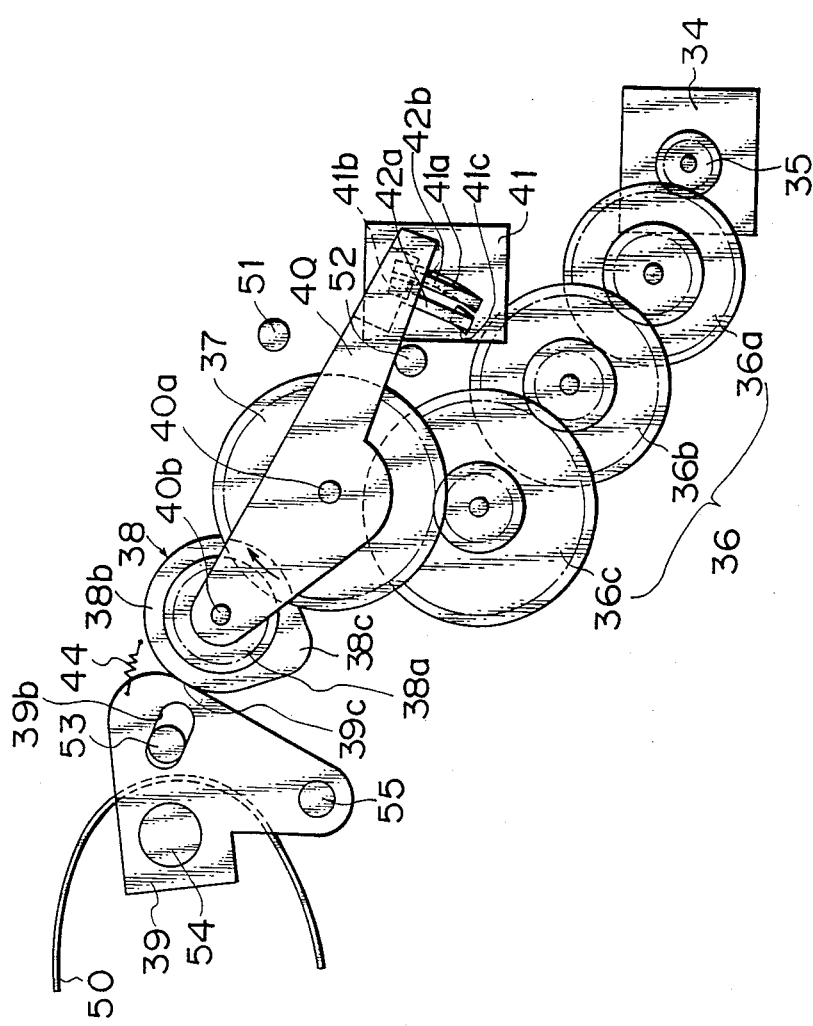
FIG. 12 is a similar view but showing the internal mechanism of FIG. 10 when the shiftable casing section is positioned at the operative position.
Figure 13:
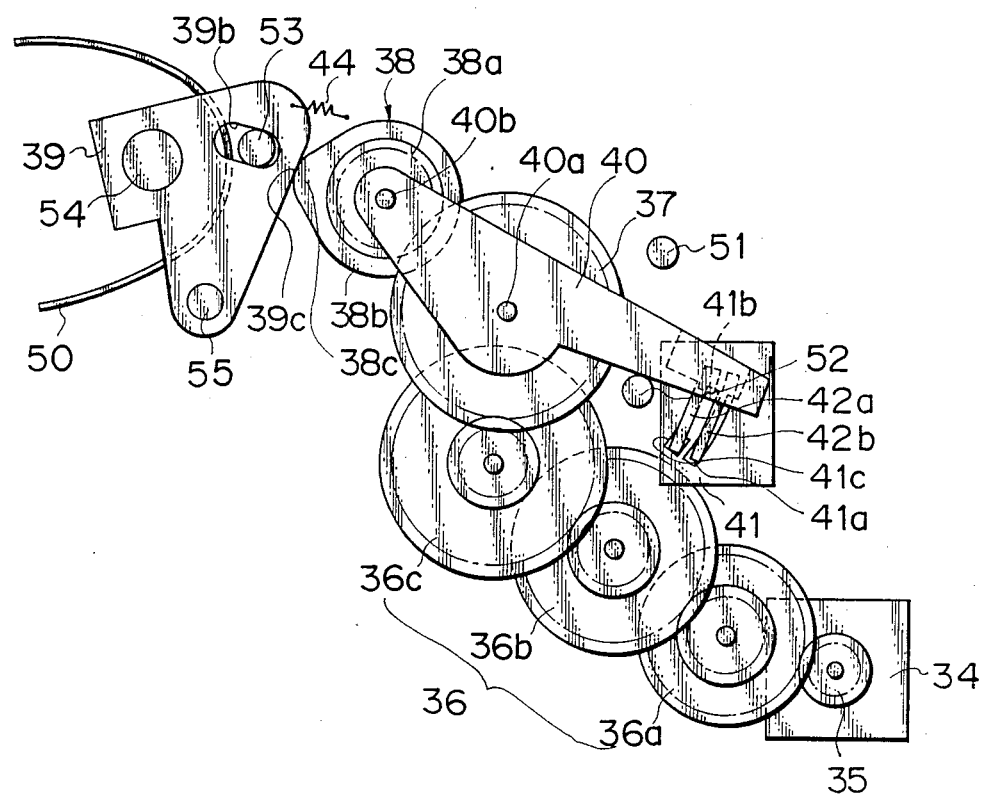
FIG. 13 is a similar view but showing the internal mechanism of FIG. 10 when the shiftable casing section is positioned at the operative position and a light emitting section is positioned for light distribution for a wide angle.

A xenon tube 54 is secured to the xenon tube supporting member 39 while a reflector 50 is secured to the shiftable case section 32. Thus, when a portion of the cam portion 38b of the planet gear 38 other than the cam lobe 38c contacts with the cam portion 39c of the xenon tube supporting member 39, the xenon tube 53 is positioned at a comparatively near position to the reflector 50 as shown in FIGS. 11 or 12 in which a light distribution characteristic for tele-photographing of a focal length greater than 50 mm. To the contrary, when the planet gear 38 is rotated to contact the cam lobe 38c of the cam portion 38b thereof with the cam portion 39c of the xenon tube supporting member 39, the xenon tube supporting member 39 is pivoted in the counterclockwise direction in FIG. 10 so that the xenon tube 54 is moved away from the reflector 50 to another position as shown in FIG. 13 in which another light distribution characteristic for wide angle photographing of a focal length smaller than 50 mm.

A light distribution change-over controlling base plate 46 is mounted on the planet gear 38 and has three conductor patterns 46a, 46b and 46c formed thereon. The conductor pattern 46a extends along a circle centered at the axis of rotation of the planet gear 38 and the other conductor patterns 46b and 46c are located at circumferentially different positions in a contiguous relationship on the inner and outer side of the conductor pattern 46a. Meanwhile, three light distribution change-over controlling contact members 47, 48 and 49 are mounted on the planet gear carrier 40 for contacting with the conductor patterns 46a, 46b and 46c on the light distribution change-over controlling base plate 46, respectively. The contact members 47, 48 and 49 may be a wide angle photographing position detecting contact member, a grounding contact member, and a tele-photographing position detecting contact member, respectively. It is to be noted that the contact members 47, 48 and 49 are shown in an exaggerated manner in an enlarged scale in FIG. 10. It is also to be noted that the locations of the light distribution change-over controlling base plate 46 and the light distribution change-over controlling contact members 47, 48 and 49 may be replaced with each other.

In order to define an inoperative lowered position and an operative lifted position of the planet gear 38, an inoperative position defining stop 51 and an operative position defining stop 52 are securely provided on the flash device body 31 for abutting engagement with the planet gear carrier 40.

Referring now to FIG. 11, the shiftable case section 32 is shown at the lowered inoperative position. In the position, the contact 42a of the light emitting section position detecting contact member 42 contacts with the inoperative position detecting pattern 41b of the light emitting portion detecting base plate 41 to provide a signal indicating that the shiftable case section 32 is at the inoperative position. In this condition, if a starting signal is delivered to the motor 34, then the motor 34 is started to rotate the pinion 35 in the clockwise direction in FIG. 11. The motor starting signal may be produced from a main switch not shown of the camera or a switch not shown of the flash device when such switch is turned on or from the two switches when the two switches are turned on. Or else, such starting signal may be produced automatically in response to a brightness of an object for photographing which is detected by a suitable detecting means and found out to require operation of the flash device.

Clockwise rotation of the motor 34 and the pinion 35 is transmitted by the reduction gear train 36 to rotate the sun gear 37 in the clockwise direction to pivot, by way of the compression coil spring 43, the planet gear carrier 40 in the clockwise direction around the axis of the shaft received in the shaft hole 40a of the planet gear carrier 40. Upon such clockwise pivotal motion of the planet gear carrier 40, the shiftable case section 32 coupled in an integral relationship to the planet gear carrier 40 is moved from the inoperative position to the operative position. The urging force of the compression coil spring 43 interposed between the sun gear 37 and the planet gear carrier 40 is naturally set to such a level that will not yield a slip between the sun gear 37 and the planetary gear carrier 40 during such pivotal motion between the inoperative position and the operative position.

Upon such clockwise pivotal motion of the planet gear carrier 40, the gear portion 38a of the planet gear 38 rolls in the clockwise direction along the outer periphery of the sun gear 37, that is, revolves around the sun gear 37. Then, after the planet gear carrier 40 is contacted with the operative position defining stop 52 as shown in FIG. 12, it is stopped by the latter and cannot be pivoted any more. Thereupon, the contact 42a of the light emitting section position detecting contact member 42 is contacted with the operative position detecting pattern 41c of the light emitting section position detecting base plate 41 to deliver to the control signal a signal indicating that the shiftable case section 32 has reached the operative lifted position.

In response to such signal, the control circuit reads information of a focal length of the photographing lens and then adjusts, in accordance with the information, the light distribution angle of the light emitting section to a position conforming to the focal length. In the case of the flash device of the present embodiment, such adjustment or change-over of the light distribution is performed by changing the distance between the xenon tube 54 and the reflector 50. Where the distance is comparatively great, a light distribution characteristic for wide angle photographing is obtained, and where the distance is comparatively small, a light distribution characteristic for tele-photographing is obtained.

In the condition shown in FIG. 12, a portion of the cam portion 38b of the planet gear 38 contacts with the cam face 39c of the xenon tube supporting member 39 and the light emitting section is positioned for a light distribution for tele-photographing. In this condition, the control circuit reads information of a focal length of a photographing lens used. As shown in FIG. 12, since the tele-photographing position detecting contact member 49 and the grounding contact member 48 on the planet gear carrier 40 contact with the conductor patterns 46a and 46b of the light distribution change-over controlling base plate 46, respectively, if the focal length is, for example, greater than 50 mm and for telephotographing, such signal is transmitted to the control circuit, and the control circuit thus stops rotation of the motor 34.

To the contrary, in case the focal length information of the photographing lens is a focal length smaller than 50 mm and for wide angle photographing, the control circuit controls to continue rotation of the motor 34 in the same direction. In this instance, however, the planetary gear carrier 40 contacts with and is held from further pivotal motion by the operative position defining stop 52 while the sun gear 37 continues its clockwise rotation yielding a slip at the compression coil spring 43 interposed between the sun gear 37 and the planetary gear carrier 40. Consequently, the planet gear 38 is rotated in the counterclockwise direction in FIG. 12 around its axis by the sun gear 37. Then, when the cam portion 38b is rotated together with the planet gear 38 from the position for the light distribution for telephotographing until the cam lobe 38c thereof is contacted with the cam face 39c of the xenon tube supporting member 39, a light distribution for wide angle photographing is obtained while the light angle position detecting contact member 47 and the ground contact member 48 on the planet gear carrier 40 are contacted with the patterns 46c and 46b of the light distribution change-over controlling base plate 46, respectively. Such signal is delivered to the control circuit to stop the motor 34. This condition is shown in FIG. 13. In this manner, the shiftable case section 32 which has the light emitting element in the form of the xenon tube 54 is changed over at the operative position thereof to the position for the light distribution for wide angle photographing.

In order to move the shiftable case section 32 reversely from the operative position to the inoperative position, the motor 34 is started to rotate reversely in the counterclockwise direction in FIGS. 12 or 13 in response to turning off of the main switch of the camera or the switch of the flash device. Counterclockwise rotation of the motor 34 rotates the sun gear 37 in the counterclockwise direction by way of the gear train 36, and such counterclockwise rotation of the sun gear 37 is transmitted by way of the compression coil spring 43 to pivot the planet gear carrier 40 in the counterclockwise direction until it is contacted with and stopped by the inoperative position defining stop 51. Thereupon, the contact 42a of the light emitting section position detecting contact member 42 is contacted with the inoperative position detecting pattern 41b of the light emitting section position detecting base plate 41 to deliver a stopping signal to the motor 34 to stop the motor 34.

On the other hand, if the shiftable case section 2 is pushed down compulsorily from the operative position shown in FIGS. 12 or 13 to the inoperative position shown in FIG. 11 by hand, the driving system from the motor 34 to the sun gear 37 is disconnected at the compression coil spring 43 from the remaining driving system including the planet gear carrier 40 and the planet gear 38 to allow the planet gear carrier 40 to be pivoted in the counterclockwise direction until it is contacted with and stopped by the inoperative position defining stop 51. Upon such pivotal motion of the planet gear carrier 40, the planet gear 38 supported for rotation on the planet gear carrier 40 is revolved in the counterclockwise direction around the sun gear 37. In this instance, while the sun gear 37 is acted upon by force to rotate the same, it will not be rotated because it is connected to the pinion 35 and the motor 34 by way of the reduction gear train 36, which provides a high load against the rotational force. Thus, the compression coil spring 43 interposed between the sun gear 37 and the planet gear carrier 40 has an action as a clutch and functions as a safety means against an external force which may be applied to the shiftable case section 32. On the other hand, in case a pulling up force is applied to the shiftable case section 32 at the inoperative position, or in case the shiftable case section 32 while being moved from the inoperative position to the operative position by the motor 34 is acted upon by a force to prevent such movement thereof, an escaping action is yielded by a slip at the compression coil spring 43 as a clutch, which will prevent possible damage to the shiftable case section 32 and any other component of the flash device.

As described above, in the present embodiment, the xenon tube 54 is moved in order to change the distance between the xenon tube 54 and the reflector 50 to change over the light distribution. For such change-over, however, the reflector 50 may be moved instead, or else such change-over can be attained by changing the distance between the light radiating panel 33 and the reflector 50 while the relative positions of the xenon tube 54 and the reflector 50 are held fixed. Further, while the single cam lobe 38c is provided on the light distribution changing over cam portion 38b formed in an integral relationship on the planet gear 38, a plurality of such cam lobes may be provided on the cam portion 38b in order to decrease the amount of rotation of the planet gear 38 and increase the speed of changing over of the light distribution.

On the other hand, while the compression coil spring 43 is provided as a friction mechanism interposed between the sun gear 37 and the planet gear carrier 40 in the embodiment described above, the friction mechanism is not limited to such compression coil spring and may be any means which transmits normal turning force between the sun gear and the planet gear carrier without yielding a slip but will yield a slip when a load higher than a predetermined level is applied. Further, the light emitting section position detecting contact members may be mounted not on the planet gear carrier but at a suitable location of the shiftable case section. Besides, the location of the friction mechanism is not limited to a location between the sun gear and the planet gear carrier, and the friction mechanism may alternatively be interposed between the planet gear and the planet gear carrier.

Figure 14:
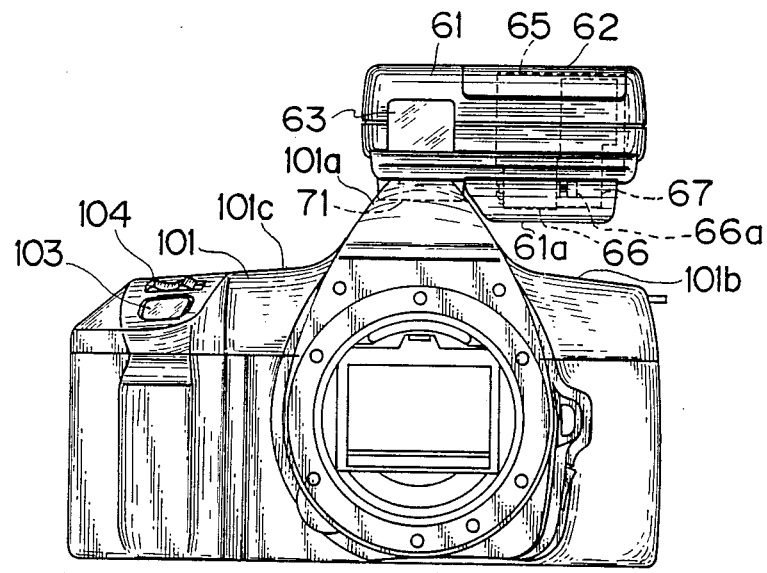
FIG. 14 is a front elevational view of a flash device mounted on a body of a camera with a light emitting section positioned at an inoperative position showing a further embodiment of the present invention.
Figure 15:
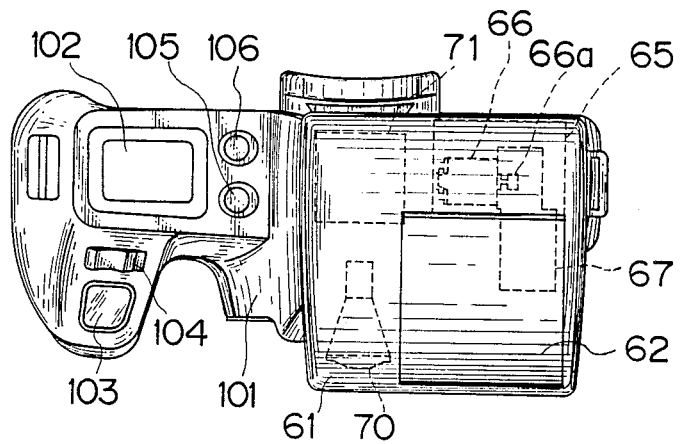
FIG. 15 is a a top plan view of the flash device and the camera body of FIG. 14.
Figure 16:
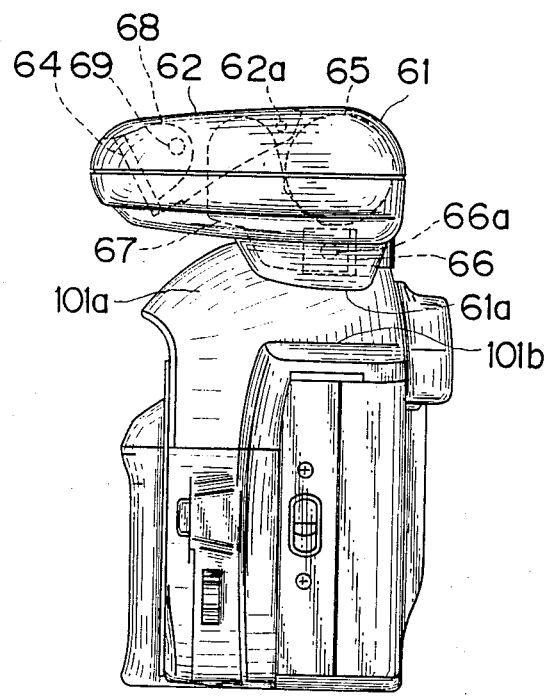
FIG. 16 is a side elevational view of the flash device and the camera body of FIG. 14.

Referring now to FIGS. 14 to 16, there is shown a flash device according to a third embodiment of the present invention. The flash device is shown mounted on a body of a camera. The flash device shown includes a flash device body 61 having a shoe seat 71 adapted to be connected to an accessory shoe not shown which is formed at the top of a central projection 101a of the camera body 101 in which a pentagonal roof prism not shown is accommodated. The shoe seat 71 is formed at a location of a bottom face of the flash device body 61 displaced to one end side and has a signal coupling section not shown provided thereon.

In the flash device of the present embodiment, the shoe seat 71 further has a power source coupling section not shown for receiving an electric power from the camera body 101.

A swollen portion 61a is formed adjacent the shoe seat 71 at a location on the other end side of the bottom face of the flash device body 61. The swollen portion 61a is located above and extends downwardly toward an inclined upper face 101b of the camera body 101 on the film rewinding side which extends in an inclined relationship from the central projection 101a.

An auxiliary illuminating light projecting device 70 is disposed within the flash device body 61 at a location upwardly forwardly of the shoe seat 71 of the flash device body 61. When an object for photographing is too dark or when the contrast of an object for photographing is too low or the like, auxiliary illuminating light can be projected from a panel 63 provided in front of the flash device body 61 in order to assure detection of a distance between the object and the camera body 61.

Figure 17:
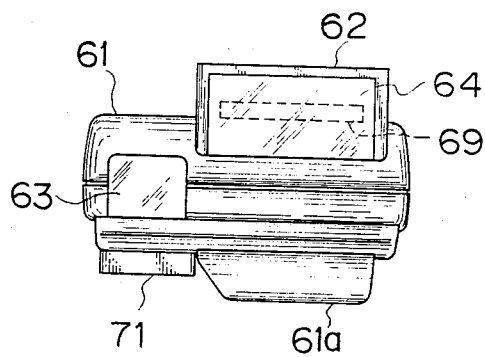
FIG. 17 is a front elevational view of the flash device shown in FIG. 14 with the light emitting section positioned at an operative position.
Figure 18:
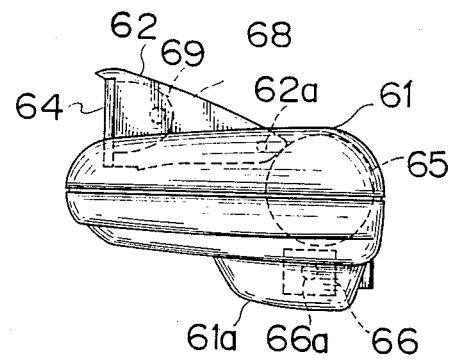
FIG. 18 is a side elevational view of the flash device of FIG. 17.

A light emitting section carrying member 62 is disposed alongside the auxiliary illuminating light projecting device 70, that is, at a location within the flash device body 61 forwardly of the swollen portion 61a formed on the bottom of the flash device body 61. The light emitting section carrying member 62 has a reflector 68 and a light emitting tube 69 mounted thereon and includes a light radiating panel 64 provided on a front face thereof. The light emitting section carrying member 62 is mounted for pivotal motion around a shaft 62a secured to the flash device body 61 and is driven to pivot between an inoperative position in which it is accommodated in the flash device body 61 as shown in FIG. 16 and an operative position in which it is projected upwardly from the flash device body 61 as shown in FIGS. 17 and 18.

A main capacitor 65 for storing therein electric energy required for emission of flash light is disposed at a location within the flash device body 61 behind the light emitting section carrying member 62, and a bi-directional motor 66 for pivoting the light emitting section carrying member 62 between the inoperative position and the operative position is disposed in the swollen portion 61a of the flash device body 61 below the main capacitor 65. A reduction gear system 67 for transmitting driving force of the motor 66 to pivot the light emitting section carrying member 62 is interposed between a pinion 66a mounted on an output power shaft of the motor 66 and part of the light emitting section carrying member 62 in such a manner as to surround the main capacitor 65 as shown in FIG. 16. The reduction gear system 67 may be such a gear train as the gear train including the gear members 6, 7 and 8 of the first embodiment or the gear train 36 of the second embodiment of the present invention described hereinabove. Rotation of the motor 66 in either direction is thus transmitted by way of the reduction gear system 67 to a gear mechanism not shown provided on the light emitting section carrying member 62 in the flash device body 61 of the flash device to pivot the light emitting section carrying member 62 between the inoperative position and the operative position.

As described hereinabove, at the top of the camera body 101, the central projection 101a in which the pentagonal roof prism not shown is accommodated is located substantially at the center of the width, and the inclined upper face 101b extends downwardly in an inclined relationship from the central projection 101a to an end portion of the camera body 101 in which a film rewinding mechanism not shown is provided. The swollen portion 61a on the bottom of the body 61 of the flash device is disposed in the spacing defined by the inclined upper face 101b and a side face of the central projection 101a contiguous to the inclined upper face 101b, and the motor 66 and the reduction gear system 67 for transmitting turning force of the motor 66 to the light emitting section carrying member 62 are disposed in the swollen portion 61a of the flash device body 61. Accordingly, the flash device in which means for automatically shifting the light emitting section carrying member 62 between the operative and inoperative positions is incorporated has a similar overall height and occupies a similar spacing, when it is mounted on the camera, as in the case of a conventional camera in which no such automatic shifting means is incorporated.

On the other hand, another upper inclined face 101c extends downwardly in an inclined relationship from the central projection 101a to the other end portion of the camera body 101, and a display device 102 for displaying an exposure value, a film frame count and so on thereon is provided on the upper inclined face 101c. Here, the flash device is not located above the inclined upper face 101c and will not disturb visual observation of the display area 102. A release button 103 and manually operable members 104, 105 and 106 are also provided on the upper inclined face 101c, and operation of them will not be disturbed by the flash device.

When the flash described above is used with the camera, the shoe seat 71 thereof is attached to the accessory shoe not shown of the camera body 101 to mount the flash device on the camera body 101. In this condition, if, for example, the switch not shown of the flash device is turned on by an operator, then a starting signal is transmitted to the motor 66 for driving the light emitting section carrying member 62 accommodated in the flash device body 61. Consequently, the motor 66 is rotated in one direction, and such rotation of the motor 66 is transmitted by way of the pinion 66a and the reduction gear system 67 to pivot the light emitting section carrying member 62 in the clockwise direction in FIG. 16 around the shaft portion 62a from the inoperative position shown in FIG. 16 to the operative position shown in FIG. 18. After then, the motor 66 is deenergized to stop.

Where the flash device is of the type wherein electric energy is supplied from the camera body side as in the present embodiment described above, supply of electric energy is started to charge the main capacitor 65 after the deenergization of the motor 66.

In order to shift the light emitting section carrying member 62 from the operative position back to the inoperative position, the switch of the flash device, for example, is turned off. In response to such signal, the motor 66 is energized reversely to rotate in the reverse direction, and such reverse rotation of the motor 66 is transmitted by way of the pinion 66a and the reduction gear system 67 to pivot the light emitting section carrying member 62 in the counterclockwise direction around the shaft portion 62a. Then, after the light emitting section carrying member 62 is pivoted to and stopped at the inoperative position, the motor 66 is deenergized to stop.

While in the embodiment described above the motor 66 and the auxiliary illuminating light projecting device 70 disposed in the flash device body 61 are located above the swollen portion 61a and the shoe seat 71 of the flash device body 61, respectively, they may be located alternatively above the shoe seat 71 and the swollen portion 61a of the flash device body 61, respectively.

Having now fully described the invention, it will be apparent to one of ordinary skill in the art that many changes and modifications can be made thereto without departing from the spirit and scope of the invention as set forth herein.

What is claimed is:
1. a flash device, comprising:
a body member;

a single driving means mounted in said body member and including a bi-directional motor;

a shiftable member having a light emitting section thereon and mounted for movement between an inoperative position in which said light emitting section is retracted in said body member and an operative position in which said light emitting section projects outside said body member;

means connected to said driving means for moving said shiftable member from said inoperative position to said operative position by rotation of said motor in a first direction, and for moving said shiftable member from said operative position to said inoperative position by rotation of said motor in a second direction; and means for changing the light distribution angle of said light emitting section from a narrow angle to a wide angle in accordance with information of a focal length of a photographing lens by rotation of said motor in said first direction.

2. A flash device which includes a flash light emitting section, comprising:

a driving means including a bi-directional motor;

an operating mechanism operated by rotation of said motor for moving said flash light emitting section between an inoperative position and an operative position; and a light distribution angle changing mechanism operated by rotation of said motor for changing the light distribution angle of said flash light emitting section after said flash light emitting section has been moved from said inoperative position to said operative position.

3. A flash device as claimed in claim 2, wherein said operating mechanism includes a sun gear, and a planet gear which revolves around said sun gear to move said flash light emitting section.

4. A flash device as claimed in claim 3, wherein said distribution angle changing mechanism is operated by said flash light emitting section upon rotation around an axis of said flash light emitting section at said operative position to change the light distribution angle of said flash light emitting section.

5. A flash device which includes a body and a light emitting section, comprising:

a bi-directional motor;

a reduction gear train connected to said motor and including a sun gear at the final stage thereof;

a planet gear held in meshing engagement with said sun gear;

a change-over cam element connected for integral rotation with said planet gear to move said light emitting section to change the light distribution angle of said light emitting section in accordance with a focal length of a photographing lens;

a shiftable member mounted for movement between an operative position and an inoperative position on said body and carrying said light emitting section thereon;

a planet gear carrier secured to said shiftable member and supporting said sun gear and said planet gear for rotation thereon;

a friction mechanism interposed between said sun gear and said planet gear; and a stopper element for stopping said planet gear carrier at said operative position of said shiftable member.

6. A flash device as claimed in claim 5, further comprisng a position detecting member located on one of said planet gear carrier or said shiftable member and said body, and a position detecting base plate located on the other of said planet gear carrier or said shiftable member and said body and cooperating with said position detecting member to detect the operative position of said shiftable member, said motor being controlled in response to such detection of the operative position of said shiftable member.

7. A flash device as claimed in claim 5, further comprising a light distribution angle detecting base plate secured to one of said planet gear and said shiftable member, and a detecting contact member secured to the other of said planet gear and said shiftable member for contacting with said light distribution angle detecting base plate to provide an electric signal, changing of said light emitting section being controlled in response to said electric signal in accordance with a focal length of a photograhing lens.

8. A flash device as claimed in claim 1, wherein said distribution angle changing means includes a cam member which is rotated by the rotation of said motor in said first direction, and a cam follower member which is driven from a first position for a narrow-angle distribution to a second position for a wide-angle distribution by said cam member.

9. A flash device, comprising:

a light emitting means;

a single driving means mounted in a body of the flash device member and including a bi-directional motor;

means for performing a predetermined operation by the rotation of said motor in a first direction; and means for changing the light distribution angle of said light emitting means by rotation of said motor in a second direction in accordance with information of a focal length of a photographing lens.

10. A flash device as claimed in claim 9, wherein said distribution angle changing means includes a cam member which is rotated by the rotation of said motor in the second direction, and a cam follower member which is driven from a first position for a wide-angle distribution to a second position for a narrow-angle distribution by said cam member.

* * * * *